US012767253B2

(12) United States Patent
Huber

(10) Patent No.: US 12,767,253 B2
(45) Date of Patent: Oct. 20, 2026

(54) MOBILE ROBOT

(71) Applicant: Georg Huber, Luxembourg (LU)

(72) Inventor: Georg Huber, Luxembourg (LU)

( * ) Notice: Subject to any disclaimer, the term of this patent is extended or adjusted under 35 U.S.C. 154(b) by 291 days.

(21) Appl. No.: 18/834,090

(22) PCT Filed: Feb. 16, 2023

(86) PCT No.: PCT/EP2023/053955
§ 371 (c)(1),
(2) Date: Jul. 29, 2024

(87) PCT Pub. No.: WO2023/156557
PCT Pub. Date: Aug. 24, 2023

(65) Prior Publication Data
US 2025/0153790 A1 May 15, 2025

(30) Foreign Application Priority Data
Feb. 17, 2022 (LU) .................................. LU102911

(51) Int. Cl.
*B62D 57/032* (2006.01)
*B25J 9/10* (2006.01)

(52) U.S. Cl.
CPC .............. *B62D 57/032* (2013.01); *B25J 9/10* (2013.01)

(58) Field of Classification Search
CPC ........... B25J 5/00; B62D 57/00; B62D 57/032
See application file for complete search history.

(56) References Cited

U.S. PATENT DOCUMENTS 4,324,302 A 4/1982 Rabinovitch

FOREIGN PATENT DOCUMENTS

| | | | | | |
|---|---|---|---|---|---|
| CN | 108749951 A | * | 11/2018 | ........... | B62D 57/032 |
| CN | 111550539 A | * | 8/2020 | ............ | F16H 47/02 |
| JP | 2003-266337 A | | 9/2003 | | |
| JP | 2006-051559 A | | 2/2006 | | |
| JP | 2007-290068 A | | 11/2007 | | |
| WO | 2008/084480 A2 | | 7/2008 | | |
| WO | 2020/169285 A1 | | 8/2020 | | |

OTHER PUBLICATIONS

International Search Report in PCT/EP2023/053955, mailed Jun. 1, 2023.
PCT—International Preliminary Report on Patentability of International Application No. PCT/EP2023/053955, Dated Jun. 19, 2024.

* cited by examiner

*Primary Examiner* — Minnah L Seoh
*Assistant Examiner* — Hosam Shabara
(74) *Attorney, Agent, or Firm* — Collard & Roe, P.C.

(57) ABSTRACT

A mobile robot includes a robot body and at least one robotic leg. The robotic leg includes an axially movable rod, which is pivotally guided on the robot body, wherein a device for axially moving the rod and a device for pivoting the rod are fastened to the robot body and thus move the rod three-dimensionally relative to the robot body and thus change the horizontal and vertical position and the inclination of the robot body relative to the ground, generally in cooperation with other robotic legs.

6 Claims, 5 Drawing Sheets

MOBILE ROBOT

CROSS REFERENCE TO RELATED APPLICATIONS

This application is the National Stage of PCT/EP2023/053955 filed on Feb. 16, 2023, which claims priority under 35 U.S.C. § 119 of Luxembourg Application No. LU102911 filed on Feb. 17, 2022, the disclosure of which is incorporated by reference. The international application under PCT article 21 (2) was not published in English.

BACKGROUND OF THE INVENTION

1. Field of the Invention

The invention relates to a mobile robot comprising a robot body and at least one robotic leg, wherein the robotic leg comprises an axially movable rod, which is pivotally guided on the robot body, wherein means for axially moving the rod and means for pivoting the rod are provided, wherein a continuous opening, in which the rod can move perpendicularly and at variable angles relative to the opening, is located at the point on the robot body provided for the robotic leg, and the robotic leg is arranged within the robot body, wherein the rod extends through the continuous opening in the robot body, or the robotic leg is axially movably articulated to the outer edge of the robot body.

In addition to robots comprising wheels and continuous tracks, there are also robots comprising legs, which are provided to move the robot body along, change its height and incline it.

2. Description of the Related Art

WO 2020/169285 A1 discloses a robotic leg comprising at least two joints, wherein each joint interconnects two segments and each joint comprises a cam, wherein the robotic leg also comprises at least one actuator and a common tendon interconnecting each cam.

CN 111550539 A relates to a drive system of a bionic robot. The hydraulic drive system comprises a housing, an adjusting motor, a hydraulic drive unit and a drive mechanism, wherein the adjusting motor is arranged at the top of an inner cavity of the housing, the hydraulic drive unit is arranged on one side of the inner cavity of the housing, and the drive mechanism is arranged in the middle of the inner cavity of the housing. In this case, a rotary disc is arranged at the bottom of the adjusting motor, and the rotary disc is in transmission connection with the adjusting motor through a synchronous belt and a synchronous wheel.

U.S. Pat. No. 4,324,302 A describes a walking machine consisting of two pillars and normally resting on the ground and supporting a load on a platform, which is positioned eccentrically between the pillars. A lifting leg is connected by means of ball joints to a foot and the platform and can be moved by means of two double-acting hydraulic cylinders to change its inclination in two planes.

These kinds of robotic leg modelled on nature have a relatively complex structure comprising joints and are therefore complex to produce and are likely to require repairs; in addition, they limit the height to which they can raise the robot body to the length of the segments with the joints outstretched.

SUMMARY OF THE INVENTION

The present invention addresses the problem of providing a mobile robot which extends the range that can be accessed by the robot body in comparison with the known robots and has a structure that is as simple as possible and is accordingly robust.

According to one aspect of the invention, this problem is solved in a mobile robot according to the preamble in that the rod is multiple times longer than the size of the robot body and the robot body can be moved along the full length of the rod in this case, wherein the rod is a first threaded rod comprising an outer thread and an axially extending groove, wherein the outer thread engages in an inner thread, which is connected to the robot body so as to be rotatable and pivotable, but not axially movable, and wherein a pin is provided in the groove to prevent the rod from rotating radially, in that a first drive for rotating the inner thread on the rod is provided as means for axially moving the rod and in that at least one further drive, which is directly or indirectly connected to the first threaded rod, is provided as means for pivoting the rod.

By axially moving the threaded rod, the robotic leg is moved in the upward or downward direction (z axis). By means of the further drive, the threaded rod is pivoted, which brings about a movement of the robotic leg in the right or left direction (x axis) or forward or backward direction (y axis).

The robotic leg according to the invention comprises a rod, on which the robot body is supported, wherein the lower end of the rod is positioned on the ground. The rod is either axially movably articulated to the outer edge of the robot body, or an opening, in which the rod can move perpendicularly and at variable angles relative to the opening, is located at the point on the robot body provided for the leg. The devices move the rod relative to the robot body in the longitudinal direction of the rod and change the angle of the rod axis relative to the robot body in two dimensions.

The devices fastened to the robot body thus move the rod three-dimensionally relative to the robot body and thus change the horizontal and vertical position and the inclination of the robot body relative to the ground, generally in cooperation with other robotic legs. The rod can be multiple times longer than the size of the robot body.

A robotic leg of this kind has a simple structure and is therefore cost-effective to produce and maintain.

This problem is solved in a mobile robot according to another aspect of the invention in that the rod is multiple times longer than the size of the robot body and the robot body can be moved along the full length of the rod in this case, wherein the rod is a preferably rectangular rack, in that a drive comprising a complementary engagement element that engages in the rack is provided as means for axially moving the rod, and in that at least one further drive, which is directly or indirectly connected to the rack, is provided as means for pivoting the rod.

The opening in the robot body can be continuous.

Advantageously, the robot body can be moved along the full length of the rod in this case. The robotic leg can be arranged within the robot body. The rod can extend through a continuous opening in the robot body.

An advantageous development of the invention is that two drives, which are directly or indirectly connected to the first threaded rod so as to be offset from one another, are provided as means for pivoting the rod.

The two drives can be offset from one another obliquely or at right angles. In this configuration, both a right or left movement (x axis) and a forward or backward movement (y axis) can take place. The two drives can be configured as servomotors.

It is also possible to provide a single drive, which pivots the rod in two axes using deflection means, for pivoting the rod, instead of the two drives.

In this case, it is sufficient for the rod to be configured as a threaded rod in portions.

The length of these portions determines the vertical adjustability of the robotic leg.

An advantageous development of the invention is that a control device is provided.

So that the robot can utilize the leg construction in various ways, the drives need to be equipped with a signal transmitter for displaying the rotation or for another display, from which the control device can derive the position of the leg. Once the control device has determined the starting positions in an initialization phase, it can move each robot foot into any position within the accessible volume; it can spread the legs apart to different degrees depending on the required standing stability; it can move the legs around obstacles and over high obstacles; it can position the robot body at any height between the ground and the length of the threaded rod.

An advantageous configuration is that an inclination sensor is provided.

An inclination sensor is advantageous for the control. As a result, the robot body can be inclined in a targeted manner, and in particular it can always be kept horizontal at a freely variable height irrespective of the nature of the terrain.

Particularly advantageously, the inclination sensor can be used to determine whether a robotic leg is in contact with the ground. For example, when moving a robotic leg towards the ground, the contact with the ground can be determined on the basis of a change in the angle of inclination when moving the robotic leg.

The path along which the robot is moving can be very steep and does not need to be cleared of obstacles. For instance, the robot can step into a hedgerow and climb over it. It can operate in shallow water and, if the legs are provided with pads, also on muddy ground. The robot leaves behind almost no trace on the ground along its path.

The robot is suitable in particular for use in agriculture and horticulture, for example in vineyards, tea plantations, and rice paddies. For this purpose, in addition to the control software for the movement, it requires a device for the specific application task, usually one or two robotic arms, including the associated control device, also requires a camera and programs for pattern recognition, for example for identifying certain plants or pests, and lastly requires a program for orientation and navigation in the terrain. If multiple robots are operating at the same time, their movements need to be relative to one another and their work needs to be coordinated.

BRIEF DESCRIPTION OF THE DRAWINGS

A configuration of the invention is explained in greater detail in the following with reference to drawings, in which.

DETAILED DESCRIPTION OF PREFERRED EMBODIMENTS

Figure 1:
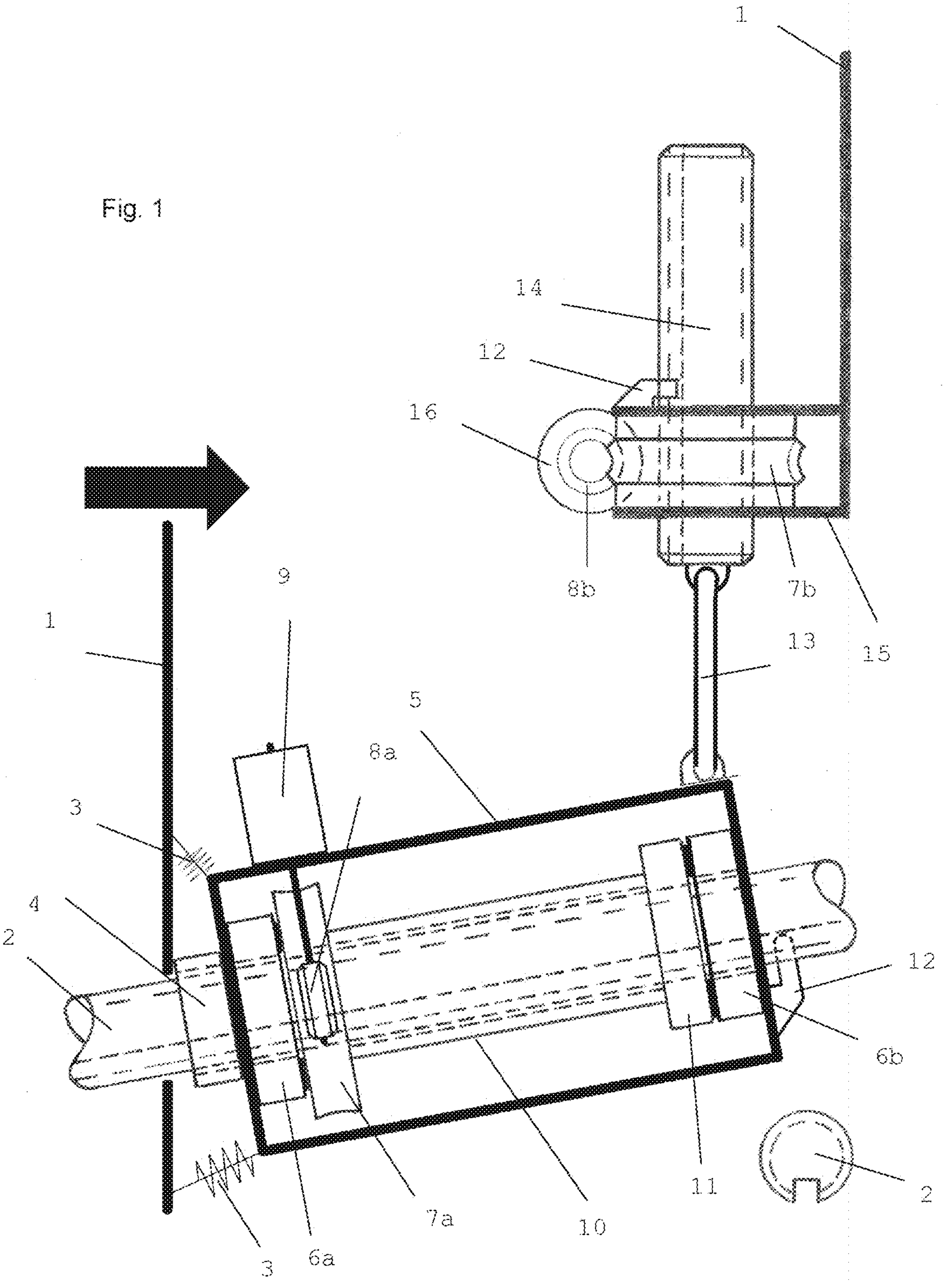
FIG. 1 is a side view of the detail of a mobile robot according to the invention that is relevant for a robotic leg.
Figure 2:
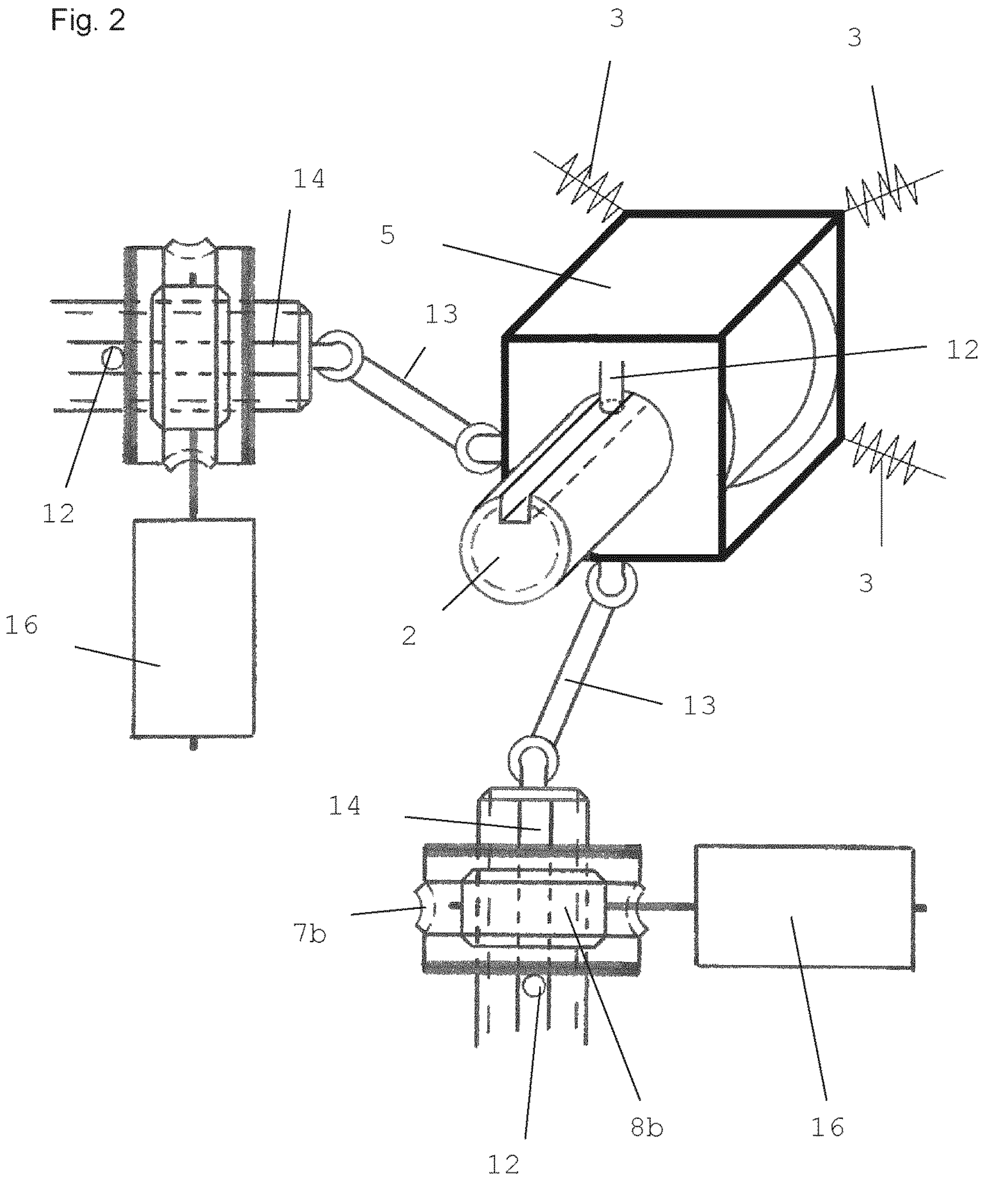
FIG. 2 is a plan view from the underside of the mobile robot according to FIG. 1.

FIGS. 1 and 2 show an exemplary embodiment of the mobile robot comprising a robotic leg.

In FIG. 1, an arrow points from top to bottom and thus specifies the viewing direction for FIG. 1.

In the exemplary embodiment, a long threaded rod 2 comprising an outer thread and an axially extending groove is used for the upward and downward movement. The threaded rod 2 runs through an opening in the robot body 1 which is rounded at the edges and is minimally larger than the cross section of the threaded rod 2. A rectangular frame 5 is suspended from this, through which the threaded rod 2 is axially moved. In the interior of the frame 5, a first ball bearing **6*a* configured for pressure is slid onto the threaded rod 2 on the upper side facing the opening. The first ball bearing 6*a* abuts a first nut 7*a*, the outside of which is provided with worm wheel teeth. A long sleeve 10 rigidly connects this first nut 7*a* to a further nut 11, which in turn abuts a second ball bearing 6*b* configured for axial pressure. The rotatable ring of this second ball bearing 6*b* abuts the frame 5. The two nuts 7*a*, 11 and the sleeve 10 connecting them can rotate freely in the frame 5**.

A motor 9 comprising a worm shaft **8*a* is fastened laterally to the frame 5 as a first drive. The worm shaft engages in the worm wheel of the first nut 7*a*, rotates it, and therefore rotates the two nuts 7*a* and 11 and thus moves the threaded rod 2 within the frame 5. A first pin 12 fastened to the frame 5 engages in the groove in the threaded rod 2** so that it does not rotate axially therewith.

The robot body 1 abuts the frame 5 via a short spacer sleeve 4. Tension springs 3 on the upper corners of the frame 5 hold the threaded rod 2 so as to be centered in the opening in the robot body 1 and at the same time allow for angular movements of the threaded rod 2.

For the right/left movements, only the underside of the frame 5 is moved, which is opposite the opening in the robot body 1. A linkage 13 connects a lower edge of the frame 5 by means of joints to the end face of a second, short threaded rod 14, which is provided with a groove.

A second nut **7*b*, which has worm gear threads on its outside, is rotated on this short threaded rod 14. A motor 16, which rotates the second nut 7*b* by means of a worm shaft 8*b*, is fastened to the robot body as a further drive. A U-shaped holder 15 that is likewise fastened to the robot body 1 and is on either side of the second nut 7*b* prevents the second nut 7*b* from moving axially, and a second pin 12, which engages in the groove in the short threaded rod 14, prevents it from rotating axially. Ball bearings between the holder and the second nut 7*b* reduce the friction on the holder 15. The rotating second nut 7*b* moves the short threaded rod 14 within the U-shaped holder 15 and thus changes the right/left angle of the long threaded rod 2 of the robotic leg by means of the linkage and frame 5**.

A further, identically constructed linkage comprising a short threaded rod and a nut rotated by a worm drive in a U-shaped holder is fastened to the lower edge of the frame 5 at a right angle to the linkage for the right-left movement. They push the robotic leg in the forward/backward direction.

Alternatively, any type of linear drive can be used for the right/left movement and the forward/backward movement.

Instead of the worm drive for the upward/downward movement, the nut can alternatively comprise a gearwheel on its outside instead of the worm wheel, which gearwheel is driven by a pinion on the motor axis that then extends in parallel with the threaded rod.

Depending on the speed of the motor, a reduction gear may be required.

In order to increase the movement speed, a rectangular rack can be used as an alternative to a threaded rod. This renders the groove for preventing axial rotation superfluous and increases the movement speed, and otherwise, for the fine control, requires a motor comprising a reduction gear or a stepper motor instead of the nut, the worm drive and the simple motor.

Figure 3:
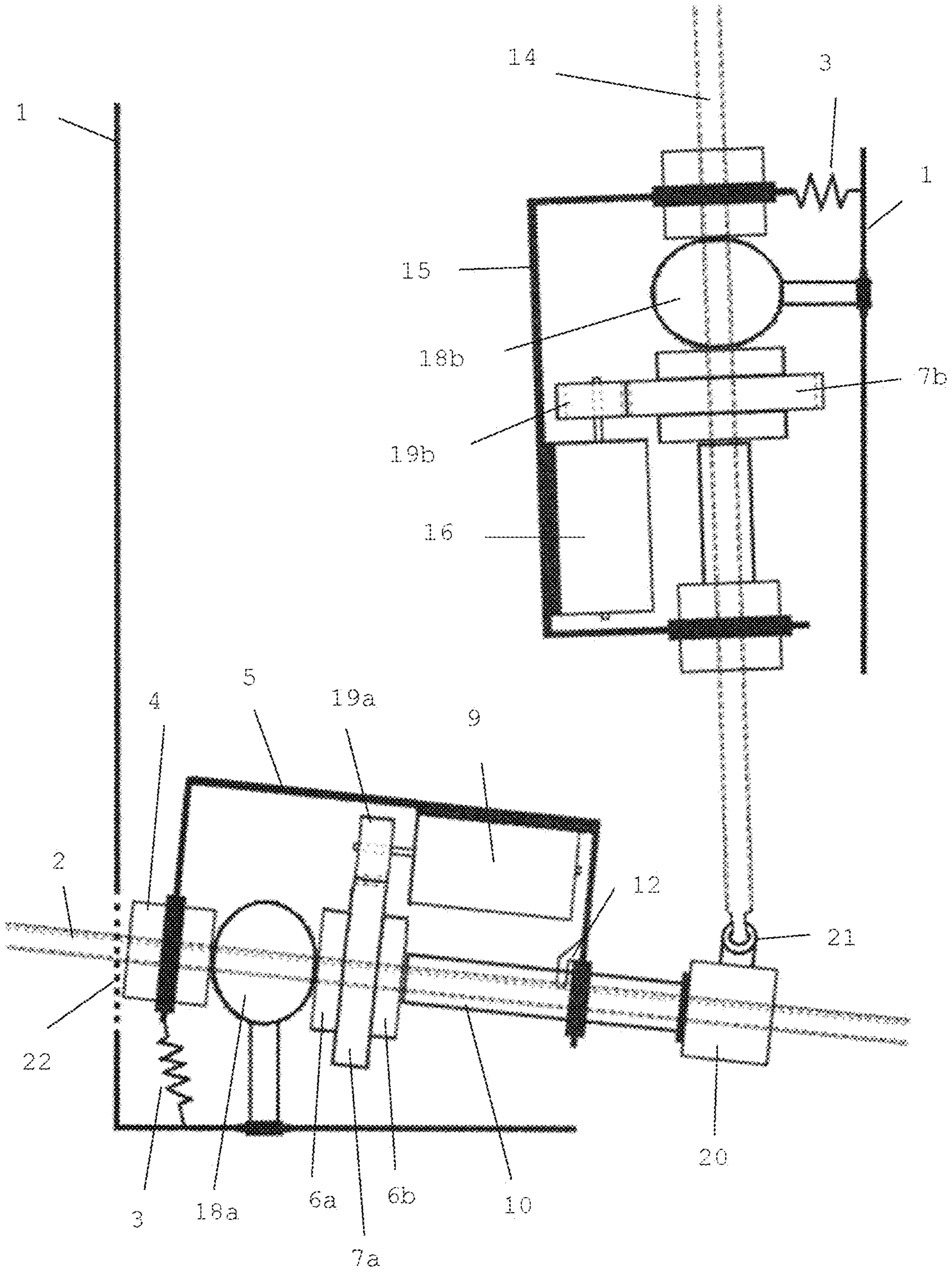
FIG. 3 is a side view of a further mobile robot according to the invention.

FIG. 3 shows a further exemplary embodiment of the mobile robot comprising a robotic leg.

In the exemplary embodiment, a long threaded rod 2 comprising an outer thread and an axially extending groove 17 is used for the upward and downward movement. The threaded rod 2 runs through an opening 22 in the robot body 1 which is rounded at the edges and is minimally larger than the cross section of the threaded rod 2. The opening 22 in the robot body 1 can be continuous. In this case, the threaded rod 2 can extend through the continuous opening 22 in the robot body 1. A U-shaped frame 5 is positioned below the opening 22, through which the threaded rod 2 is axially moved.

In the interior of the frame 5, a spacer sleeve 4 is slid onto the threaded rod on the upper side facing the opening 22. The spacer sleeve 4 is rigidly connected to the frame 5 and forms a sliding bearing for the axial movement of the threaded rod 2. The threaded rod 2 extends through an opening in a first ball joint 18*a*. The robotic leg is fastened to the robot body 1 by the first ball joint 18*a*. The first ball joint 18*a* allows for angular movements of the threaded rod 2 together with the frame 5.

A first ball bearing 6*a* configured for pressure abuts the first ball joint 18*a*. The first ball bearing 6*a* is slid onto the threaded rod 2. The first ball bearing 6*a* abuts a first nut 7*a*, the outside of which is configured as a spur gear. This first nut 7*a* abuts a second ball bearing 6*b* configured for axial pressure. The rotatable rings of the two ball bearings 6*a* and 6*b* abut the nut 7*a*. The nut 7*a* can rotate freely in the frame 5. A long sleeve 10 abuts the ball bearing 6*b*. The long sleeve 10 extends through the frame 5 and is connected thereto. The two sleeves 4 and 10 connected to the frame prevent an axial movement of the first nut 7*a* along the threaded rod 2 and relative to the frame 5.

A motor 9 comprising a first pinion 19*a* is fastened laterally to the frame 5 as a first drive. The first pinion 19*a* engages in the gearwheel of the first nut 7*a*, rotates it, and therefore rotates the nut 7*a* and thus moves the threaded rod 2 within the frame 5. A pin 12 fastened to the frame 5 engages in the groove in the threaded rod 2 so that it does not rotate axially therewith.

Tension springs 3 on the upper corners of the frame 5 prevent the frame 5 from rotating radially about the threaded rod 2 and allow for angular movements of the frame 5 and therefore the threaded rod 2 about the ball joint 18.

For the right/left movements, only the underside of the frame 5 is moved, which is opposite the opening 22 in the robot body 1. A sliding bearing 20 is connected to the frame 5 by means of the long sleeve 10. Two Cardan joints 21 are fastened to the outside of the sliding bearing 20 at an angle of 90°. The Cardan joint 21 is connected to the sliding bearing 20 at one end and to a short threaded rod 14 at the other end. The Cardan joint 21 allows for variable angular positions of the short threaded rod 14 relative to the threaded rod 2. Here, the Cardan joint 21 blocks axial rotations of the short threaded rod 14.

A second nut 7*b*, the outside of which is configured as a spur gear, is rotated on this short threaded rod 14. A motor 16, which rotates the second nut 7*b* by means of a second pinion 19*b*, is fastened to the robot body 1 as a further drive. A U-shaped holder 15 that is likewise fastened to the robot body 1 via a second ball joint 18*b* and is on either side of the second nut 7*b* prevents the second nut 7*b* from moving axially. The short threaded rod 14 does not comprise a groove, since the Cardan joint 21 prevents the short threaded rod 14 from rotating axially. The rotating second nut 7*b* moves the short threaded rod 14 within the U-shaped holder 15 and thus changes the right/left angle of the long threaded rod 2 of the robotic leg by means of the Cardan joint 21, the sliding bearing 20 and the frame 5.

A further, identically constructed linkage comprising a short threaded rod and a nut rotated by the pinion in a U-shaped holder is fastened to the lower edge of the frame 5 at a right angle to the linkage for the right-left movement. They push the robotic leg in the forward/backward direction.

Alternatively, any type of linear drive can be used for the right/left movement and the forward/backward movement.

Depending on the speed of the motor, a reduction gear may be required.

In order to increase the movement speed, a rectangular rack can be used as an alternative to a threaded rod. This renders the groove for preventing axial rotation superfluous and increases the movement speed, and otherwise, for the fine control, requires a motor comprising a reduction gear or a stepper motor instead of the nut, the gearwheel and the simple motor.

The robotic leg can be arranged within the robot body. In this case, the threaded rod 2 can extend through a continuous opening 22 in the robot body.

Figure 4:
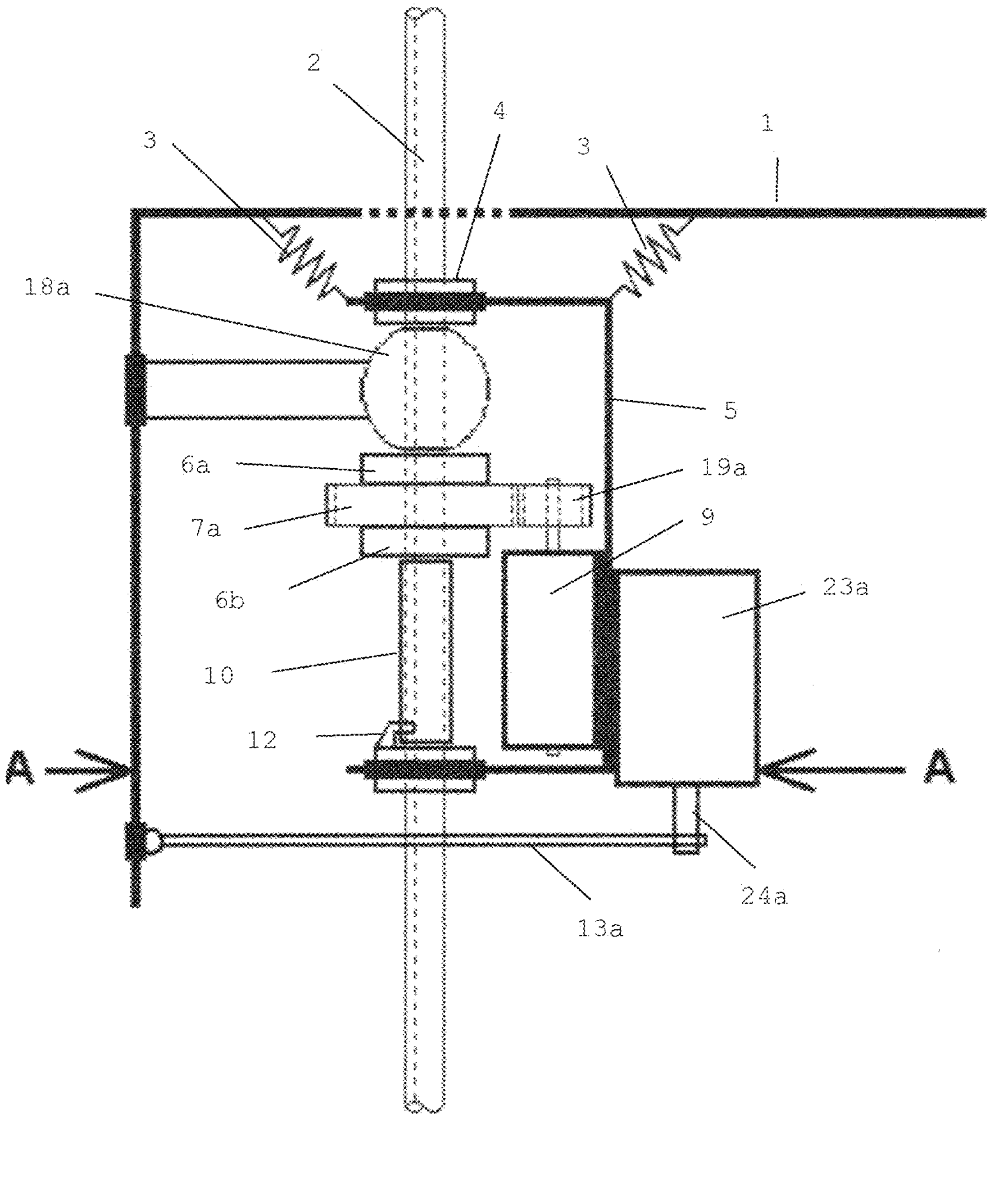
FIG. 4 is a side view of a further mobile robot.
Figure 5:
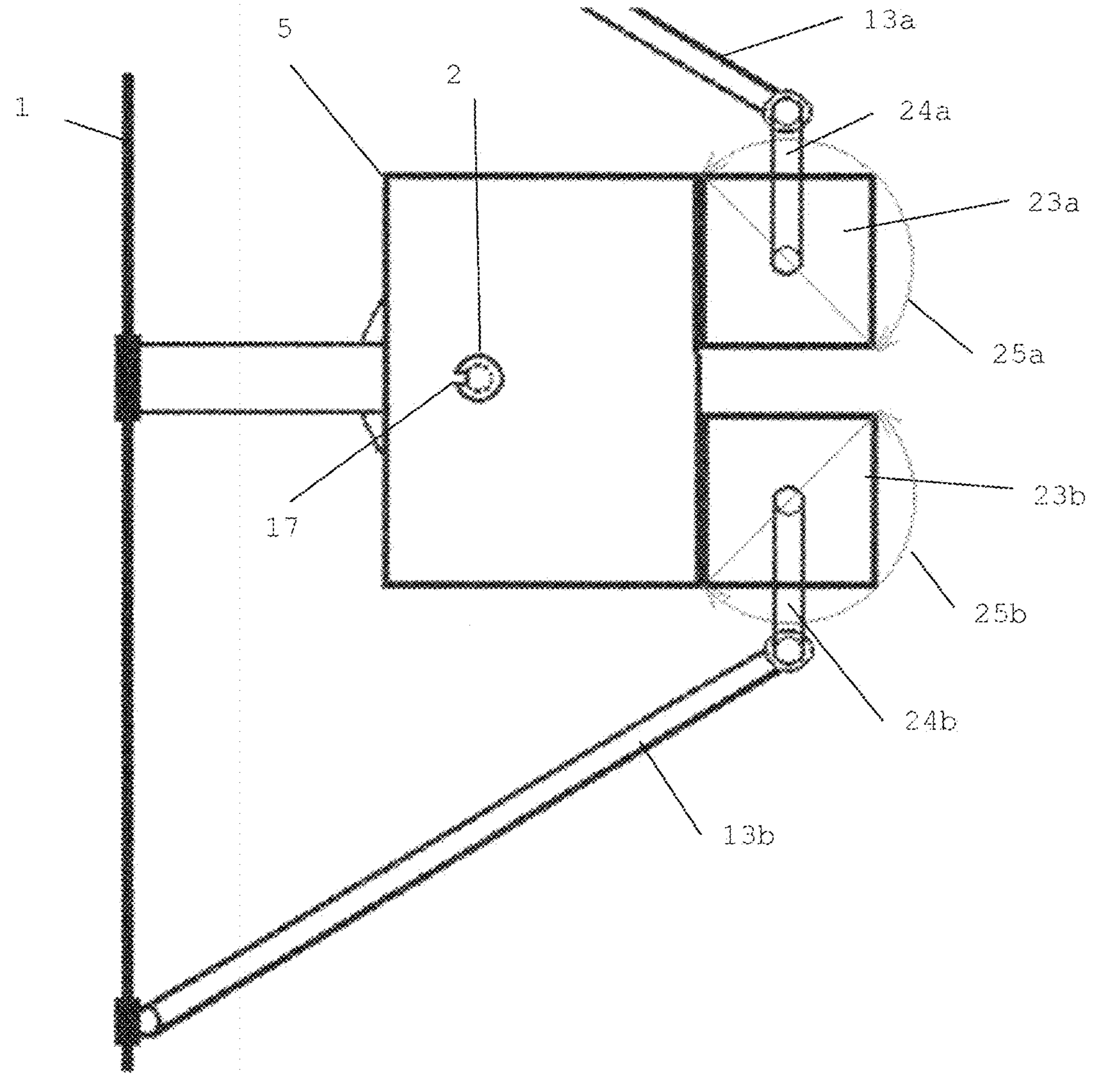
FIG. 5 is a cross section of the mobile robot according to FIG. 4.

FIG. 4 shows a further exemplary embodiment of the mobile robot comprising a robotic leg. FIG. 5 is a cross section through the mobile robot according to FIG. 4 along the sectional line A-A.

In the exemplary embodiment, a long threaded rod 2 comprising an outer thread and an axially extending groove 17 is used for the upward and downward movement. The threaded rod 2 runs through an opening 22 in the robot body 1 which is rounded at the edges and is minimally larger than the cross section of the threaded rod 2. The opening 22 in the robot body 1 can be continuous. In this case, the threaded rod 2 can extend through the continuous opening 22 in the robot body 1. Advantageously, the mobile robot can be configured to be particularly compact in this way. A U-shaped frame 5 is positioned below the opening 22, through which the threaded rod 2 is axially moved.

In the interior of the frame 5, a spacer sleeve 4 is slid onto the threaded rod on the upper side facing the opening 22. The spacer sleeve 4 is rigidly connected to the frame 5 and forms a sliding bearing for the axial movement of the threaded rod 2. The threaded rod 2 extends through an opening in a first ball joint 18*a*. The robotic leg is fastened to the robot body 1 by the first ball joint 18*a*. The first ball joint 18*a* allows for angular movements of the threaded rod 2 together with the frame 5.

A first ball bearing 6*a* configured for pressure abuts the first ball joint 18*a*. The first ball bearing 6*a* is slid onto the threaded rod 2. The first ball bearing 6*a* abuts a first nut 7*a*, the outside of which is configured as a spur gear. This first nut 7*a* abuts a second ball bearing 6*b* configured for axial pressure. The rotatable rings of the two ball bearings 6*a* and 6*b* abut the nut 7*a*. The nut 7*a* can rotate freely in the frame 5. A long sleeve 10 abuts the ball bearing 6*b*. The long sleeve 10 extends through the frame 5 and is connected thereto. The two sleeves 4 and 10 connected to the frame prevent an axial movement of the first nut 7*a* along the threaded rod 2 and relative to the frame 5.

A motor 9 comprising a first pinion 19*a* is fastened laterally to the frame 5 as a first drive. The first pinion 19*a* engages in the gearwheel of the first nut 7*a*, rotates it, and therefore rotates the nut 7*a* and thus moves the threaded rod 2 within the frame 5. A first pin 12 fastened to the frame 5 engages in the groove in the threaded rod 2 so that it does not rotate axially therewith.

Tension springs 3 on the upper corners of the frame 5 prevent the frame 5 from rotating radially about the threaded rod 2 and allow for angular movements of the frame 5 and therefore the threaded rod 2 about the ball joint 18.

For the right/left movement, two servomotors 23*a* and 23*b* are connected on the underside of the frame 5. An arm 24*a* and 24*b*, which can rotate together with the relevant servomotor 23*a* and 23*b* within the angular range 25*a* and 25*b*, is arranged on each of the two servomotors 23*a* and 23*b*. A linkage 13*a* and 13*b* is movably connected on each of the arms 24*a* and 24*b*. The linkages 13*a* and 13*b* are fastened to the robot body 1. A deflection of the arm 24*a* or 24*b* away from the robot body 1 pulls the servomotor 23*a* or 23*b* towards the robot body 1, such that the frame 5 rotates about the first ball joint 18*a* and the threaded rod 2 is angled outwards. The linkages 13*a* and 13*b* are arranged approximately at right angles to one another, and therefore the two servomotors 23*a* and 23*b* can move the threaded rod 2 in the two horizontal dimensions.

The robotic leg can be arranged within the robot body. In this case, the threaded rod 2 can extend through a continuous opening 22 in the robot body.

LIST OF REFERENCE SIGNS

1 Robot body
2 Rod
3 Tension spring
4 Spacer sleeve
5 Frame
6*a* First ball bearing
6*b* Second ball bearing
7*a* First nut
7*b* Second nut
8*a* Worm shaft
8*b* Worm shaft
9 Motor
10 Sleeve
11 Nut
12 Pin
13 Linkage
13*a* First linkage
13*b* Second linkage
14 Short threaded rod
15 Holder
16 Drive
17 Axially extending groove
18*a* First ball joint
18*b* Second ball joint
19*a* First pinion
19*b* Second pinion
20 Sliding bearing
21 Cardan joint
22 Opening
23*a* First servomotor
23*b* Second servomotor
24*a* First arm
24*b* Second arm
25*a* First angular range
25*b* Second angular range

The invention claimed is:

1. A mobile robot comprising a robot body (1) and at least one robotic leg, wherein the robotic leg comprises an axially movable rod (2), which is pivotally guided on the robot body (1), wherein means (6, 7*a*, 8*a*, 9, 10, 11) for axially moving the rod (2) and means (7*b*, 8*b*, 14, 15, 16) for pivoting the rod (2) are provided, wherein a continuous opening (22), in which the rod (2) can move perpendicularly and at variable angles relative to the opening, is located at the point on the robot body (1) provided for the robotic leg, and the robotic leg is arranged within the robot body, wherein the rod extends through the continuous opening (22) in the robot body (1), or the robotic leg is axially movably articulated to the outer edge of the robot body (2), wherein the rod (2) is multiple times longer than the size of the robot body (1) and the robot body (1) can be moved along the full length of the rod (2) in this case, wherein the rod (2) is a first threaded rod comprising an outer thread and an axially extending groove, wherein the outer thread engages in an inner thread, which is connected to the robot body (1) so as to be rotatable and pivotable, but not axially movable, and wherein a pin (12) is provided in the groove to prevent the rod (2) from rotating radially, wherein a first drive (9) for rotating the inner thread on the rod (2) is provided as means (6, 7*a*, 8*a*, 9, 10, 11) for axially moving the rod (2) and wherein at least one further drive (16), which is directly or indirectly connected to the first threaded rod, is provided as means (7*b*, 8*b*, 14, 15, 16) for pivoting the rod.

2. The mobile robot according to claim 1, wherein two drives (16), which are directly or indirectly connected to the first threaded rod so as to be offset from one another, are provided as means for pivoting the rod (2).

3. The mobile robot according to claim 1, wherein the rod (2) is configured as a threaded rod in portions.

4. The mobile robot according to claim 1, wherein a control device is provided.

5. The mobile robot according to claim 1, wherein an inclination sensor is provided.

6. A mobile robot comprising a robot body (1) and at least one robotic leg, wherein the robotic leg comprises an axially movable rod (2), which is pivotally guided on the robot body (1), wherein means (6, 7*a*, 8*a*, 9, 10, 11) for axially moving the rod (2) and means (7*b*, 8*b*, 14, 15, 16) for pivoting the rod (2) are provided, wherein a continuous opening (22), in which the rod (2) can move perpendicularly and at variable angles relative to the opening, is located at the point on the robot body (1) provided for the robotic leg, and the robotic leg is arranged within the robot body, wherein the rod extends through the continuous opening (22) in the robot body (1), or the robotic leg is axially movably articulated to the outer edge of the robot body (2), wherein the rod (2) is multiple times longer than the size of the robot body (1) and the robot body (1) can be moved along the full length of the rod (2) in this case, wherein the rod (2) comprises a rack, wherein a drive comprising a complementary engagement element that engages in the rack is provided as means for axially moving the rod (2), and wherein at least one further drive, which is directly or indirectly connected to the rack, is provided as means for pivoting the rod.

* * * * *